United States Patent [19]

Tiedemann, Jr.

[11] Patent Number: 5,604,730
[45] Date of Patent: Feb. 18, 1997

[54] REMOTE TRANSMITTER POWER CONTROL IN A CONTENTION BASED MULTIPLE ACCESS SYSTEM

[75] Inventor: Edward G. Tiedemann, Jr., San Diego, Calif.

[73] Assignee: QUALCOMM Incorporated, San Diego, Calif.

[21] Appl. No.: 280,095

[22] Filed: Jul. 25, 1994

[51] Int. Cl.[6] .................................................. H04J 3/14
[52] U.S. Cl. ............................. 370/252; 455/69; 370/335
[58] Field of Search .................................. 370/18, 13, 17, 370/95.1, 95.2, 95.3, 110.1, 77; 455/38.3, 69, 70, 92, 68, 95; 375/200, 205, 206, 208; 340/825.08

[56] References Cited

U.S. PATENT DOCUMENTS

| | | | |
|---|---|---|---|
| 4,998,245 | 3/1991 | Tanaka et al. | 370/95.1 |
| 5,056,109 | 10/1991 | Gilhousen et al. | 370/18 |
| 5,216,692 | 6/1993 | Ling | 375/1 |
| 5,333,175 | 7/1994 | Ariyavisitakul et al. | 455/69 |

FOREIGN PATENT DOCUMENTS 9208435  10/1992  WIPO .......................... H04L 27/30

OTHER PUBLICATIONS

"Admission Control Schemes for Wireless Communication Networks with Adjustable Transmitter Powers", *IEEE Infocom '94*, Shou C. Chen et al., Jun. 12, 1994, pp. 21–28.

*Primary Examiner*—Wellington Chin
*Assistant Examiner*—Huy D. Vu
*Attorney, Agent, or Firm*—Russell B. Miller; Roger W. Martin

[57] ABSTRACT

The power control process of the present invention enables a base station communicating over a forward packet channel to a mobile radio to control the power of the mobile radio transmitting over a reverse packet channel to the base station. The base station maintains a maximum energy per bit to total interference spectral density ratio threshold for the reverse channel as well as a desired threshold that results in a low frame error rate. By comparing each radiotelephone's estimated energy per bit to total interference spectral density ratio to the desired and maximum thresholds, power control commands to increase or decrease the radiotelephone's transmit power are generated depending on the outcome of the comparison.

29 Claims, 10 Drawing Sheets

REMOTE TRANSMITTER POWER CONTROL IN A CONTENTION BASED MULTIPLE ACCESS SYSTEM

BACKGROUND OF THE INVENTION

1. Field of the Invention

The present invention relates to wireless communications. More particularly, the present invention relates to power control in a CDMA communication system.

2. Description of the Related Art

A packet is one method of packaging user data. Typically, the packet is divided up into various fields, with each field comprising one or more bits. Each field is used for a predetermined function such as user data, addresses, error detection, etc. Data packets can be formed according to pre-existing protocols such as X.25 and TCP/IP that are well known in the art.

Packets may be used with a true packet service in which the application, transport, or other layer generates the packet. Packets can also be generated by a network's lower protocol layer that breaks a stream of data bits into data packets of predetermined length.

Data packets can be transmitted over a radio channel using many methods. A first method uses a dedicated channel to carry packets between a pair of radio transceivers. A second method encompasses a single, central radio transceiver that transmits over a common channel to one or more other radio transceivers that are monitoring for packets containing data in the address field signifying that radio transceiver's particular address. A third method uses a random access or contention based protocol in which the packets are transmitted from one or more radio transceivers to either a central terminal or each other.

In a typical CDMA cellular communication system that follows the Telecommunications Industries Association/ Electronic Industries Association Interim Standard 95 (TIA/ EIA/IS-95), the dedicated channel corresponds to a traffic channel. This channel transmits voice and data signals between the mobile radio and the base station. The common channel approach corresponds to transmitting on the paging channel that is used to broadcast pages in a CDMA system when each page carries an address. The random access approach corresponds to the access channel. A typical CDMA-type communication system is described in greater detail in U.S. Pat. No. 5,103,459 to Gilhousen et al. and assigned to Qualcomm, Inc.

When one or more packets are to be transmitted between a base station and mobile radio or vice versa, a traffic channel can be allocated between the two. Once a packet is transmitted, the time to the next packet is often unknown. Instead of having the traffic channel allocated and unused, the channel is deallocated after a period of idleness. This period can be fixed with the period determined by analyzing typical traffic patterns. Alternatively, this period can also be variable with the period set by analyzing the transmitted packet stream.

The allocation of traffic channels presents at least two problems. First, the traffic channel takes time to set up, thus delaying the packet transmission. In some instances, setting up a traffic channel could require more than a second. Second, the resources to set up and use a traffic channel may be too expensive to justify the transmission of infrequent packets, short packets, or short sequences of packets.

Power control in a CDMA system is very important since a large number of mobile radios are transmitting on the same frequency. If one mobile is transmitting at a power output that is too large, it can degrade the received $^{Eb}/_{Io}$ from other mobile radios to the point that the base station cannot correctly demodulate transmissions. If the mobile radio transmits at too low of an output power, the received $^{Eb}/_{Io}$ from the mobile radio at the base station will be too low to properly demodulate the $^{Eb}/_{Io}$ received signal. The mobile radio's transmit power, therefore, has an affect on system capacity.

The correlation between $^{Eb}/_{Io}$ and system capacity can be shown as follows. When there are no mobile radios in other cells, the maximum number of simultaneous transmissions, N, is approximately:

$$N \approx \frac{W/R - (E_b/I_o)_{des}(N_o W/P_r)}{(E_b/I_o)_{des}}$$

where:

W=spreading bandwidth,

R=data rate, $(^{Eb}/_{Io})_{des}$=desired quality metric subsequently explained in greater detail, $N_0$=thermal noise spectral density of the base station receiver, and $P_r$=received power per transmission.

The second term in the numerator is typically very small compared to $^W/_R$, therefore, $$N \approx \frac{W/R}{(E_b/I_o)_{des}} .$$

Thus, a system using a higher desired $^{Eb}/_{Io}$ lowers capacity.

For the $i^{th}$ mobile radio, the received $^{Eb}/_{Io}$, denoted by $(^{Eb}/_{Io})_i$, at the base station is approximately $$(E_b/I_o)_i \approx \frac{P_{ri}/R}{\sum_{j \neq i} P_{rj}/W} .$$

The probability that the transmission can be successfully demodulated is high if $(^{Eb}/_{Io})_i$ exceeds $(^{Eb}/_{Io})_{des}$ as is described above. If $P_{ri}$ is large, however, the $^{Eb}/_{Io}$ is degraded for other mobile radios. If the received $^{Eb}/_{Io}$ falls below $(^{Eb}/_{Io})_{des}$, the probability that the transmission will not be successfully demodulated is high.

The mobile radio dynamically adjusts its transmit power using closed and open loop power control in order to maintain the proper received $^{Eb}/_{Io}$ at the base station as channel conditions change or the range to the base station changes. Open loop power control adjusts the mobile radio's transmit power autonomously by measuring the received power on the forward channel. Closed loop power control adjusts the mobile radio's transmit power by a feedback bit stream from the base station. The base station measures the received $^{Eb}/_{Io}$ to determine the feedback bit stream. Closed loop and open loop power control together determine the mobile radio's transmit power, as disclosed in U.S. Pat. No. 5,056,109 to Gilhousen et al. and assigned to Qualcomm, Incorporated.

Closed loop power control compensates for the differences in fading between the forward and reverse links, such as occurs when they are different frequencies. Additionally, it serves to compensate for the differences in transmit and receive path gains in the mobile radio and base station.

Closed loop power control is possible in a typical communication system since there is one traffic channel per mobile radio. This one-to-one channel pairing permits the base station to measure the mobile radio's reverse channel power and for the mobile radio to utilize the power control bit stream from the base station on the forward channel.

A multi-access channel, however, does not have a one-to-one channel pairing, as multiple mobile radios can transmit simultaneously. The identity of the mobile radio, therefore, is not necessarily known to the base station. Also, the mobile radios do not know the number of mobile radios transmitting, thus the association of the power control bit stream is not clear to the mobile radio.

Since the mobile radio aligns its transmit timing with the timing of the signals that it receives from the base station and all base station signals are time aligned, when two simultaneous transmissions occur on the reverse channel and there is no multipath, the transmissions arrive at the base station separated by times equal to the difference of twice the distances between each mobile radio and the base station. If this time exceeds one pseudo noise chip, the two transmissions can be distinguished by the base station. The inability to distinguish these multipath transmissions is a collision.

When there is multipath, there is no collision if the base station can identify and properly combine the multipath components. If three or more access channel transmissions occur in the same slot, then some transmissions may collide while others do not. In a typical multi-access channel, such as is found in a TDMA or an FDMA system, when two simultaneous transmissions occur there is a collision and neither transmission is successfully demodulated by the base station.

Base stations may further reduce interference with each other by transmitting with the minimum power necessary for their signals to be received by the base station. A mobile radio transmits its first transmission or probe at a power level somewhat less than it estimates to be necessary to reach the base station. This conservative estimate may be a predetermined value or it may be calculated in response to the measured power level of a signal that the mobile radio has or is receiving from the base station.

A preferred embodiment is for the mobile radio to measure the received power from the base station. This received power is the transmitted power of the base station times the path loss. The mobile radio then uses this estimate, plus a constant correction, plus adjustment factors to set the initial transmit power. These adjustment factors may be sent to the mobile radio from the base station. Some of these factors correspond to radiated power of the base station. Since the path loss from the mobile station to the base station is essentially the same as from the base station to the mobile station, the signal received at the base station should be at the correct level, assuming that the base station has supplied the appropriate correction factors and that the mobile radio and base station gains are error free.

After transmitting the first access probe at this minimum power level, the mobile station increases the power of successive probes within each access probe sequence by a predetermined step amount. A thorough discussion of access probes is evident in IS-95, section 6.6.3.1 and in co-pending U.S. patent application, *Apparatus and Method for Reducing Collisions Between Mobile Stations Simultaneously Accessing a Base Station in a CDMA Cellular Communications System,* Ser. No. 08/219,867 to Tiedemann et al. and assigned to Qualcomm, Inc.

In addition, between successive transmissions of an access probe, the mobile radio can randomize its transmission time and choose another access channel so as to avoid a potential collision. IS-95, section 6.6.3.1 describes this in greater detail.

It can be seen, therefore, that power control is very important for proper operation of a CDMA radiotelephone system. There is a resulting need for a power control process in a multiple access system to increase system capacity.

SUMMARY OF THE INVENTION

The power control process of the present invention uses a comparison threshold to determine whether the base station should instruct the mobile radios to increase or decrease their transmit power. The total received $^{Eb}/_{Io}$ for all the mobile radios communicating with a particular base station is compared to a maximum threshold for the reverse channel. Additionally, a minimum comparison threshold for the mobile radio being controlled is determined. If the total received $^{Eb}/_{Io}$ is greater than or equal to the maximum threshold or the minimum received $^{Eb}/_{Io}$ for any mobile radio is greater than the reverse channel minimum, the base station instructs the mobile radios to decrease their output power. If the total received $^{Eb}/_{Io}$ is less than the maximum reverse channel threshold and the minimum received $^{Eb}/_{Io}$ for any mobile radio is less than or equal to the reverse channel minimum, the base station instructs the mobile radios to increase power.

DETAILED DESCRIPTION OF THE PREFERRED EMBODIMENT

The present invention encompasses a pair of channels, subsequently referred to as the forward and reverse packet channels. The base station communicates with the mobile radios over the forward channel and the mobile radios communicate with the base station over the reverse channel. A base station uses the power control process of the present invention, over the forward packet channel, to dynamically adjust the transmit power of one or more mobile radios transmitting on the reverse packet channel.

The following discussion refers to mobile radios and base stations as the preferred embodiment. Mobile radios include radiotelephones used in both a terrestrially based communication system and a satellite based communication system. Similarly, the base stations can be located on the earth or as orbiting satellites.

The reverse packet channel, in the preferred embodiment, is a variable rate channel that transmits data packets that have been broken up into a sequence of one or more frames. In an alternate embodiment, the reverse packet channel handles data at a fixed rate.

Each transmission includes a preamble, to aid in spread spectrum acquisition, followed by the datagram. The preamble of the reverse packet channel is the same as the preamble used in the access channel; a sequence of one or more unmodulated frames of Walsh function 0. The access channel preamble is discussed in greater detail in TIA/EIA IS-95. Alternate embodiments use other preambles than the Walsh function 0. Another alternate embodiment includes frames modulated by known frequencies. However, this increases receiver complexity.

Figure 3A:
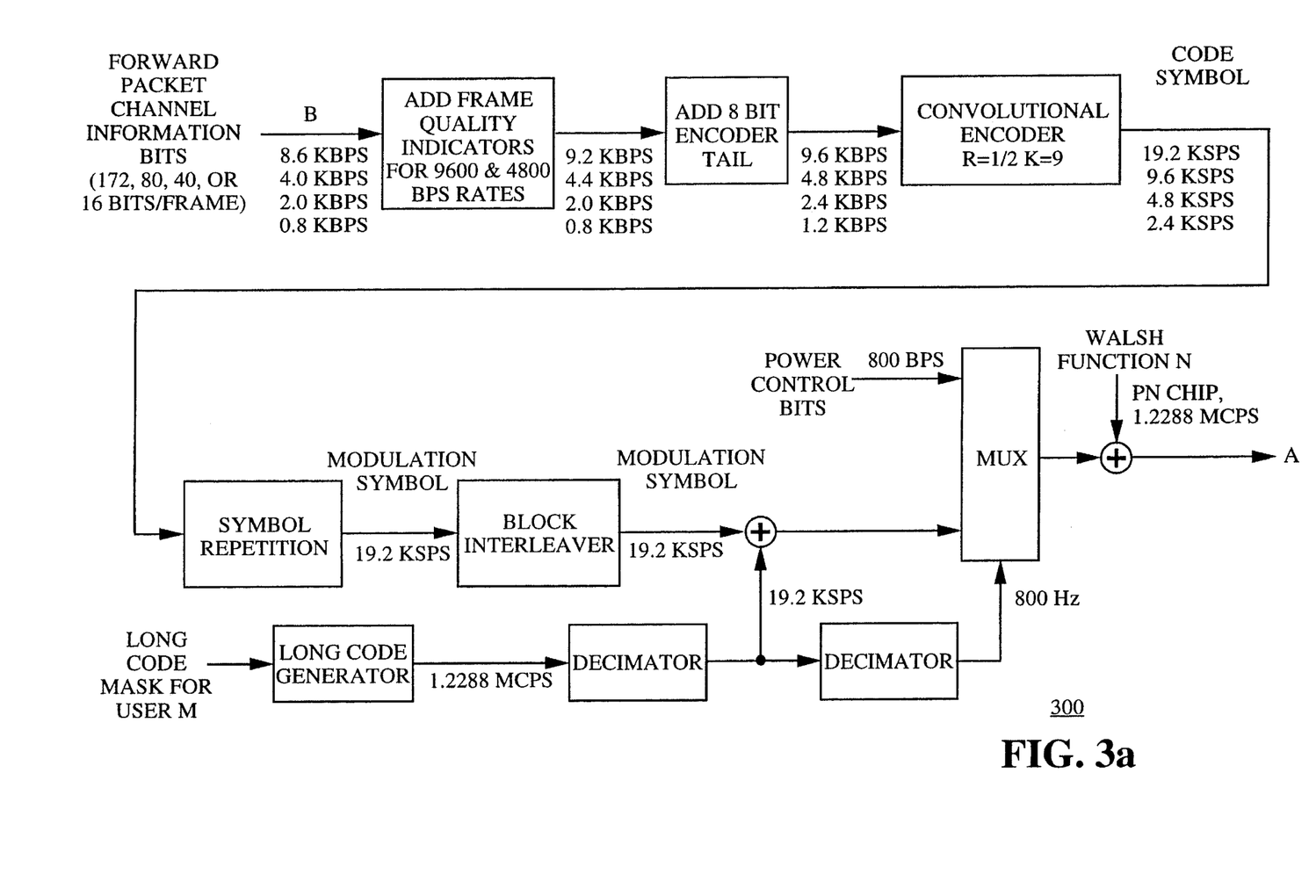
FIGS. 3*a* and 3*b* show a typical forward packet channel structure in accordance with the present invention.
Figure 3B:
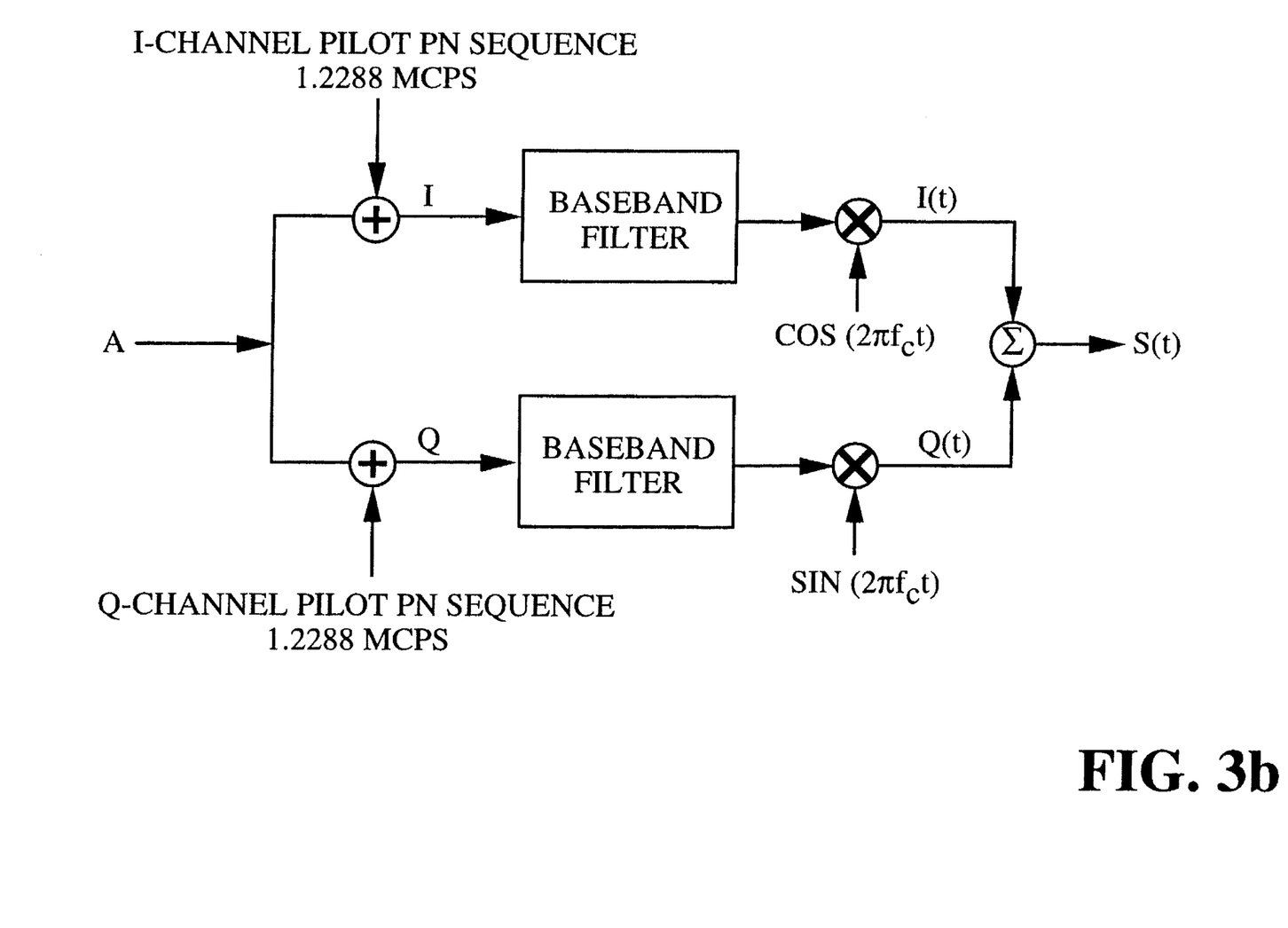
Figure 7:
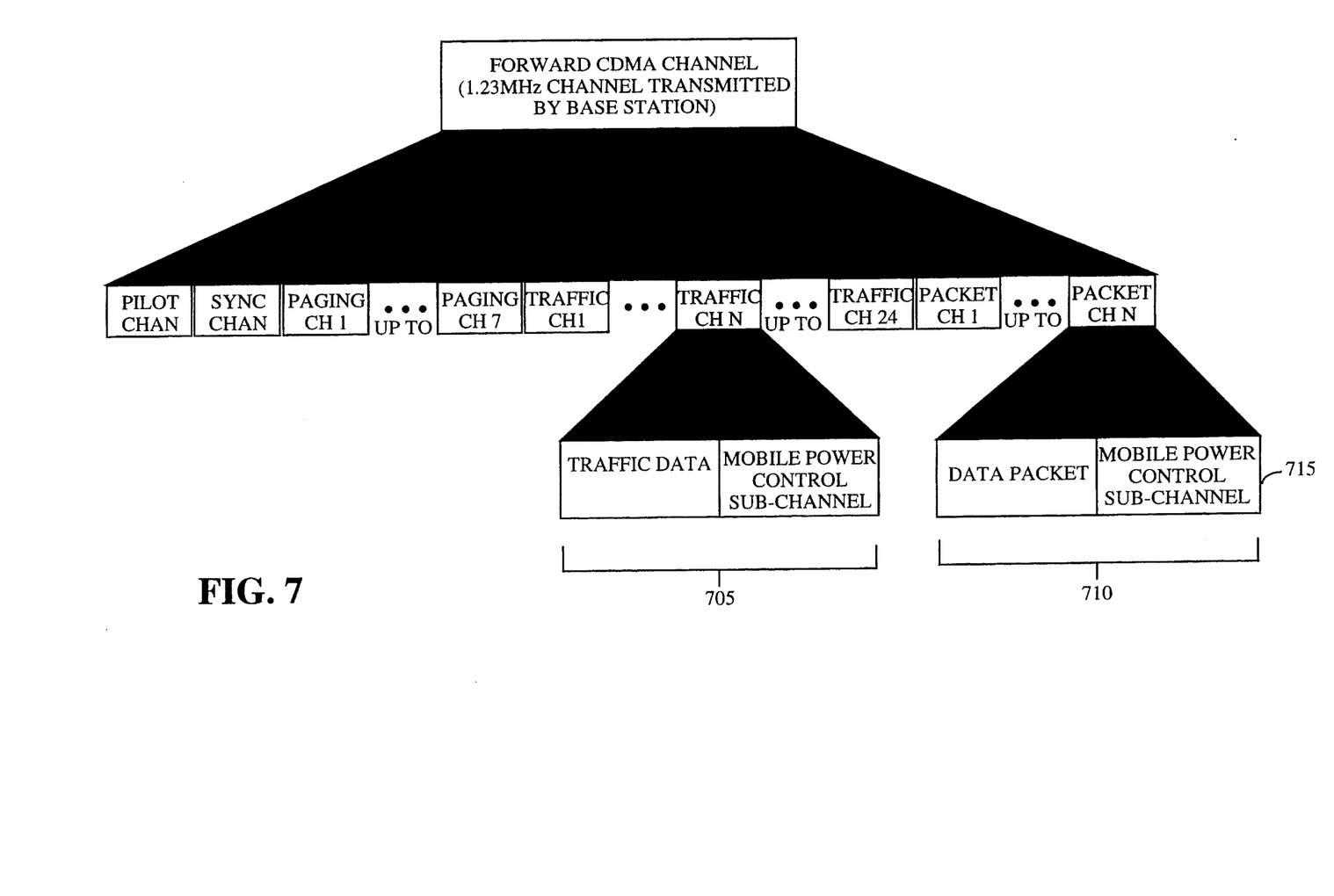
FIG. 7 shows the format of a forward CDMA channel in accordance with the present invention.

In the preferred embodiment, the forward CDMA channel consists of a pilot channel, a synchronization channel, one or more paging channels, one or more forward packet channels and forward traffic channels. FIG. 7 illustrates the format of the preferred embodiment of the forward CDMA channel including the traffic channels (705) and packet channels (710) with power control subchannels (715). The forward packet channel is a spread spectrum channel similar in operation to the forward traffic channel as disclosed in IS-95 as is illustrated in FIGS. 3a and 3b. A more complete discussion of this channel can be found in IS-95.

Figure 8:
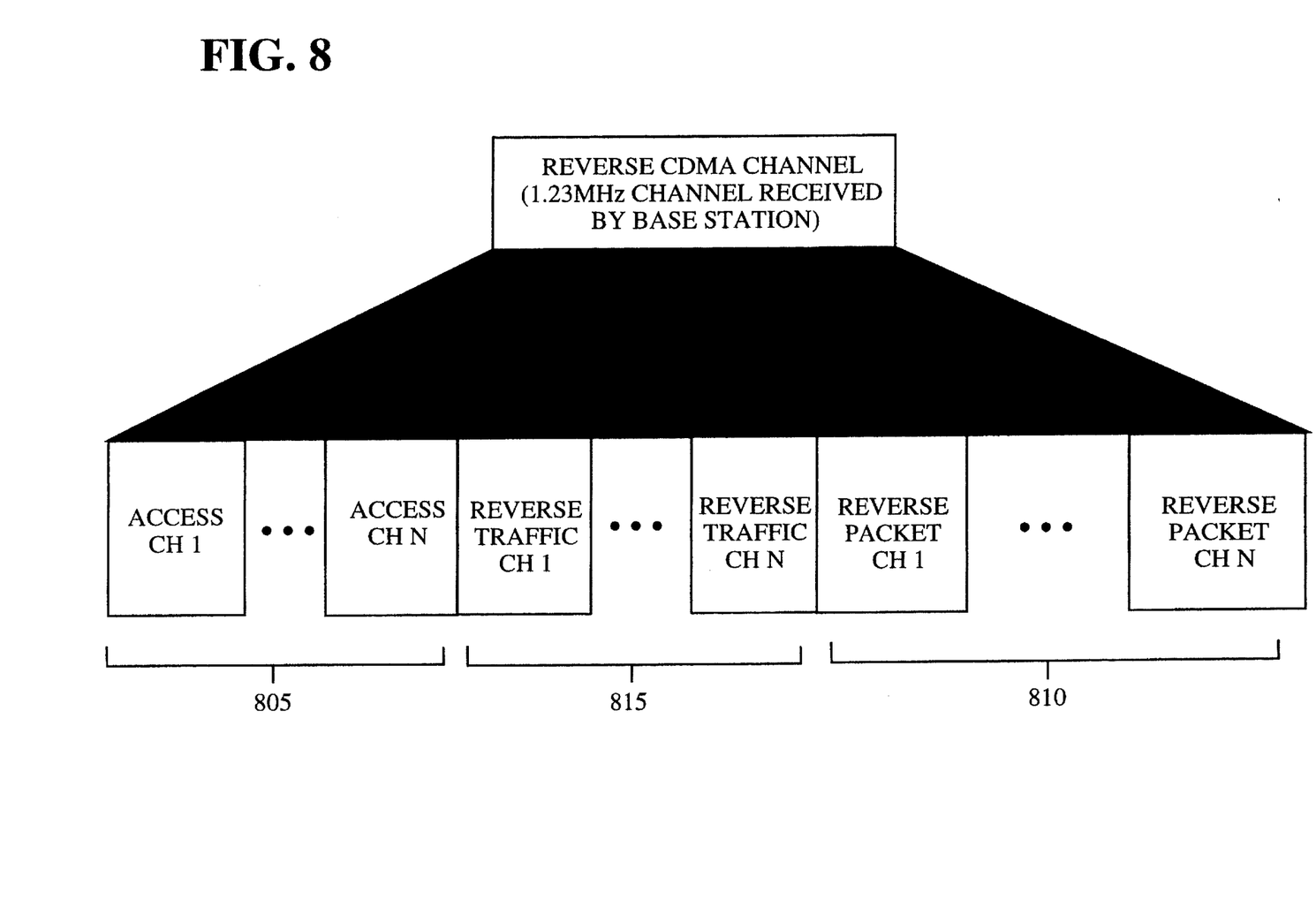
FIG. 8 shows the format of a reverse CDMA channel in accordance with the present invention.

FIG. 8 illustrates the format of the reverse CDMA channel. A set of one or more access channels (805) are associated with each paging channel. An overhead message defines the number of access channels (805) that are associated with a particular paging channel. Similarly, one or more reverse packet channels are associated with a forward packet channel and an overhead message defines the number of reverse packet channels associated with a particular forward packet channel. Different reverse packet channels (810) associated with the same forward packet channel are differentiated by each reverse packet channel having a unique spreading code.

In the preferred embodiment, assignment of a reverse packet channel to a forward packet channel is static in that a mobile radio continually monitors the same forward packet channel while in the same cell. The channel may be assigned by using information from overhead parameters, by assignment on a per mobile radio basis, or via some static procedure.

The reverse packet channels enable multiple mobile radios to transmit simultaneously. In the preferred embodiment of a CDMA system, the multiple transmissions from multiple mobile radios only collide if their multipath components overlap as was described previously. In the preferred embodiment, a mobile radio randomly chooses, for its transmissions, one of the reverse packet channels associated with a forward packet channel. Alternate embodiments use other methods for choosing channels. Additionally, the transmission time of a radio using a reverse packet channel can be randomized as is done for the access channel. These techniques lower the probability of a collision by distributing the mobile radios over channels or time. This also serves to increase system capacity. When the mobile radio retransmits a packet, it may randomize transmission time and choice of reverse packet channel so as to avoid collisions as previously described for the access channel.

Figure 1:
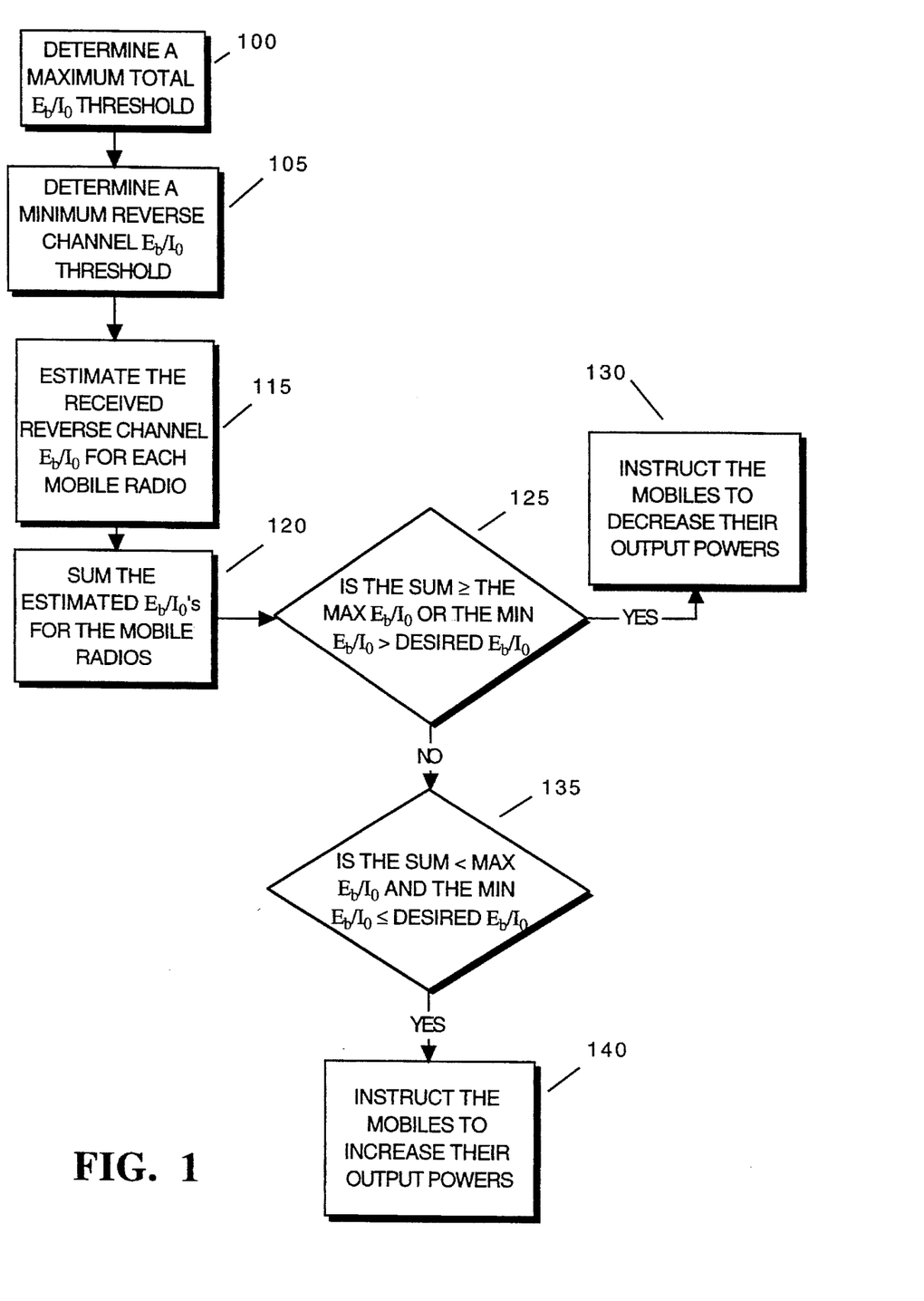
FIG. 1 shows a flowchart of the process of the present invention.

A flowchart of the power control process of the present invention is illustrated in FIG. 1. In the preferred embodiment, this process uses the dimensionless ratio $^{Eb}/_{Io}$ to determine whether to adjust the radio's transmit power and, if so, whether to increase or decrease the power. Alternate embodiments use other signal quality metrics for threshold comparison such as $^{Pr}/_{No}$, $P_r$, or some scaled equivalent of $^{Eb}/_{Io}$; $P_r$ being the received power.

The $^{Eb}/_{Io}$ ratio is a standard quality measurement for digital communications system performance. The ratio expresses the energy per bit to the total interference spectral density of the channel. $^{Eb}/_{Io}$ can be considered a metric that characterizes the performance of one communication system over another; the smaller the required $^{Eb}/_{Io}$ the more efficient is the system modulation and detection process for a given probability of error. A more detailed discussion of this concept can be seen in B. Sklar, *Digital Communications, Fundamentals and Applications*, Chapter 3 (1988).

The process of the present invention, in the preferred embodiment, is used in a typical CDMA cellular radiotelephone system as disclosed in the '459 patent described above. The radiotelephone system is comprised of numerous radiotelephones that transmit to a base station over a reverse channel and receive from the base station over a forward channel.

The maximum total $^{Eb}/_{Io}$ is subsequently referred to as the allocated $^{Eb}/_{Io}$ (step 100). The allocated $^{Eb}/_{Io}$ may vary with the traffic channel load.

The allocated $^{Eb}/_{Io}$ is used by the base station as the maximum threshold for all mobile radios transmitting to that base station. If a particular mobile radio transmitting to the base station requires a transmit power increase, the base station will not instruct the mobile radio to increase its transmit power beyond the allocated $^{Eb}/_{Io}$.

Figure 2:
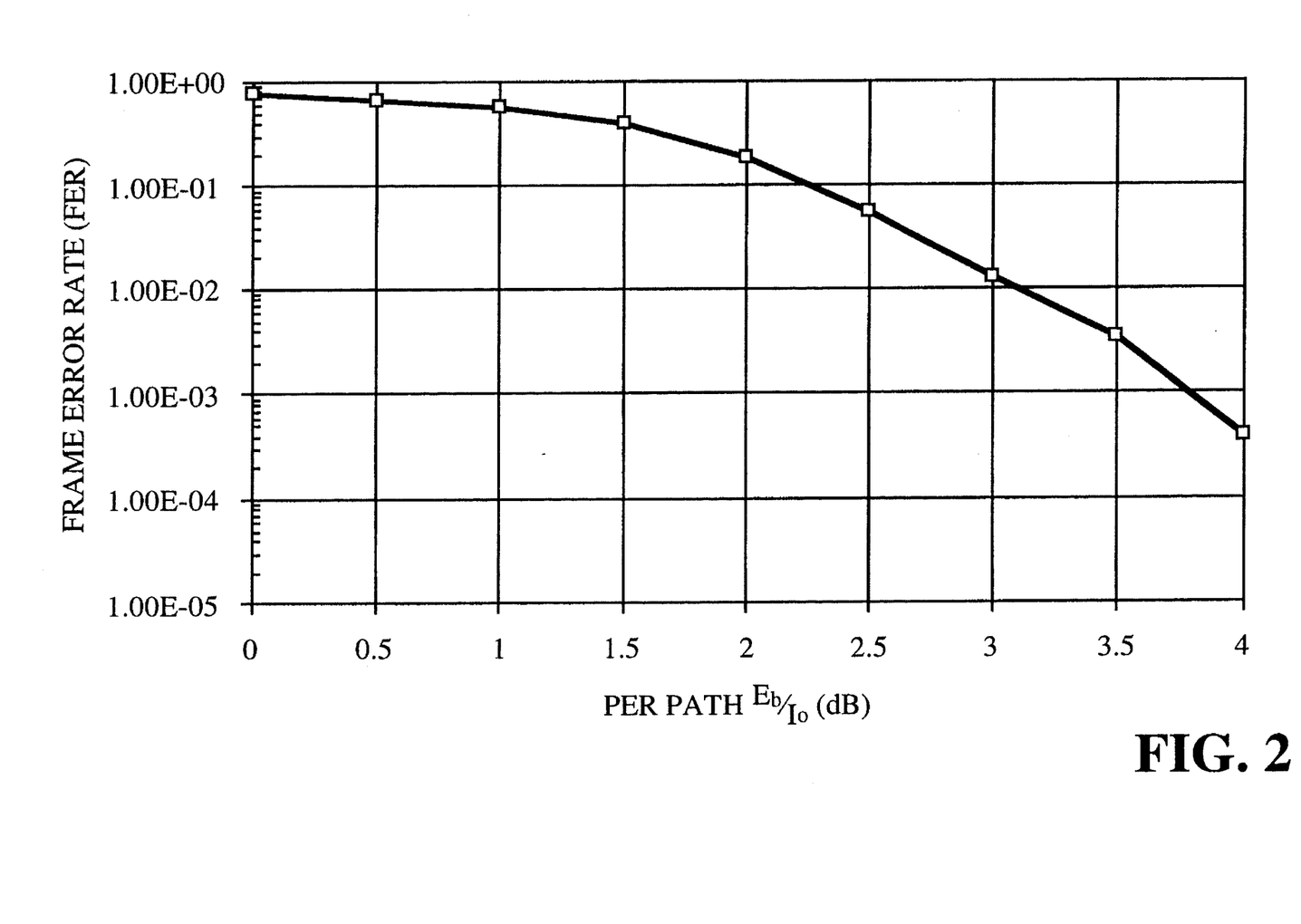
FIG. 2 shows a graph of the frame error rate versus $^{Eb}/_{Io}$.

In the preferred embodiment, the reverse link has a desired $^{Eb}/_{Io}$ assigned to it by the base station (step 105). The desired ratio is the value that gives a high probability that a data packet will be received without error from the base station and yet maintains a high capacity as explained above. As an example, a packet consisting of 10 frames with a 3 dB $^{Eb}/_{Io}$ has an approximate error rate of 10%, as seen in FIG. 2.

Choosing a larger $^{Eb}/_{Io}$ causes the packet error probability of the transmission to decrease. This is illustrated in the graph of FIG. 2. This plot shows the effect to the frame error rate of increasing $^{Eb}/_{Io}$. For example, referring to FIG. 2, if the $^{Eb}/_{Io}$ is 4 dB, the resulting error rate for the 10 frame packet is 4×10⁻³. If $^{Eb}/_{Io}$ is chosen too large, however, the transmitted signal may cause interference to other mobile radios communicating with the base station.

The received $^{Eb}/_{Io}$ of each mobile radio is estimated by the base station (step 115). Since the base station acquires the mobile radios during the transmission of the packet preamble, it can determine the number of mobile radios that are transmitting to the base station. These individual $^{Eb}/_{Io}$'s for the base station are summed (step 120) and, as will be discussed later, the sum is used in determining the proper power control command to be sent to the mobile radios.

In the preferred embodiment, all mobile radios that are listening to the same forward packet channel are also receiving the same power control bit stream. Thus each power control bit stream controls all the mobile radios that are transmitting on any of the reverse packet channels that are associated with the forward packet channel.

Figure 4:
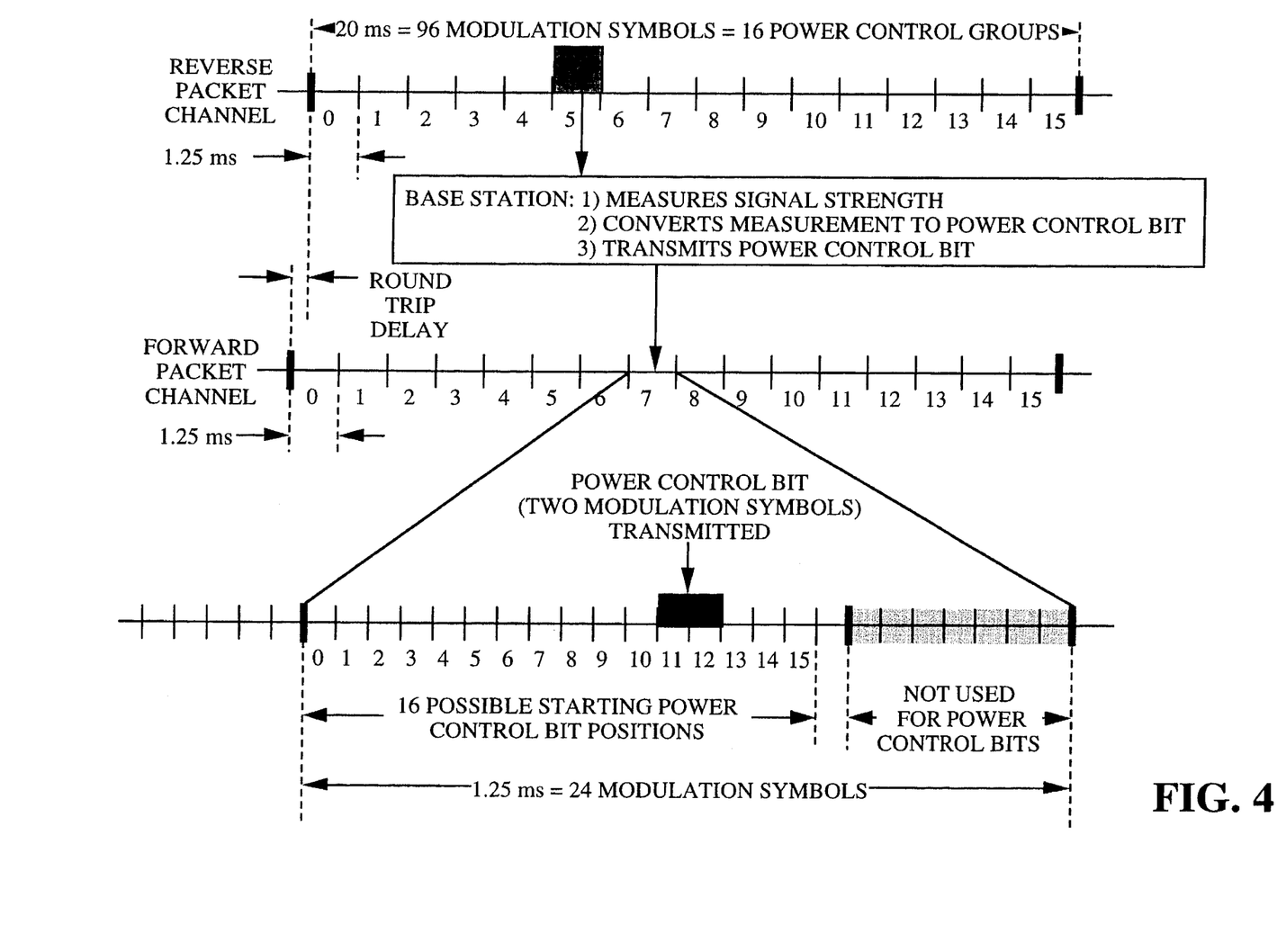
FIG. 4 shows the power control bit positions in accordance with the present invention.

The base station controls the mobile radio's transmit power using closed loop power control. In other words, if the base station determines that the transmit power of the received signal is too high, the base station sends a command to the mobile radio to decrease its transmit power. The base station sends a command instructing an increase if the transmit power is too low. This power control command, in the preferred embodiment, is two modulation symbols. The preferred embodiment format of such a word is illustrated in FIG. 4.

In the preferred embodiment, the power control bit of the present invention is set by the base station according to the following conditions. The power control bit is set to a 1, instructing the mobile radio to decrease its power output if the following condition is true:

$$\left( \sum_i (E_b/I_o)_i \geq \text{allocated } E_b/I_o \right)$$

OR $$\left( \left( \min_i (E_b/I_o)_i \right) > \text{desired } E_b/I_o \right)$$

where i=the $i^{th}$ mobile radio.

The power control bit is set to a 0, instructing the mobile radio to increase its power output if the following condition is true:

$$\left( \sum_i (E_b/I_o)_i < \text{allocated } E_b/I_o \right)$$

AND $$\left( \left( \min_i (E_b/I_o)_i \right) \leq \text{desired } E_b/I_o \right)$$

where i=the $i^{th}$ mobile radio.

In other words, the first condition (step 125) is true when the total or sum of the $^{Eb}/_{Io}$'s of all the mobile radios communicating with the base station is greater than or equal to the maximum $^{Eb}/_{Io}$ or when the minimum $^{Eb}/_{Io}$ of any one of the mobile radios is greater than the desired $^{Eb}/_{Io}$. In this case, the total amount of $^{Eb}/_{Io}$ that has been allocated to the reverse packet channel has been exceeded as might be the case when too many mobile radios are transmitting. A particular mobile radio's $^{Eb}/_{Io}$ could also have been higher than needed and the received signal may perturb the remaining reverse packet channel users so the mobile radio's power output needs to be decreased (step 130).

The second condition (step 135) is true when the sum of the $^{Eb}/_{Io}$'s of all the mobile radios communicating with the base station is less than the maximum $^{Eb}/_{Io}$ and when the minimum $^{Eb}/_{Io}$ of any one of the mobile radios is less than or equal to the desired $^{Eb}/_{Io}$. In both cases, the mobile radio's $^{Eb}/_{Io}$ is too low and the received signal may not be demodulated correctly so the mobile radio's power output needs to be increased (step 140).

Alternate embodiments of the power control process of the present invention uses other conditions yielding similar results. Also, the other comparison thresholds mentioned above could be substituted in the above conditions to yield similar results.

In an alternate embodiment of the power control process of the present invention, the base station determines if the command to increase power will cause the mobile radio's power output to exceed the allocated $^{Eb}/_{Io}$. If this is true, the base station commands the mobile radio to decrease its transmit power instead of increasing.

If there is a single transmission on the reverse packet channel of the present invention, power control is performed on the traffic channel as discussed in U.S. Pat. No. 5,056,109 to Gilhousen et al. and assigned to Qualcomm, Inc. When there are multiple transmissions, the base station tries to keep the mobile radio with the poorer $^{Eb}/_{Io}$ at the allocated $^{Eb}/_{Io}$, subject to the constraint that the total received $^{Eb}/_{Io}$ is not too great.

Figure 9:
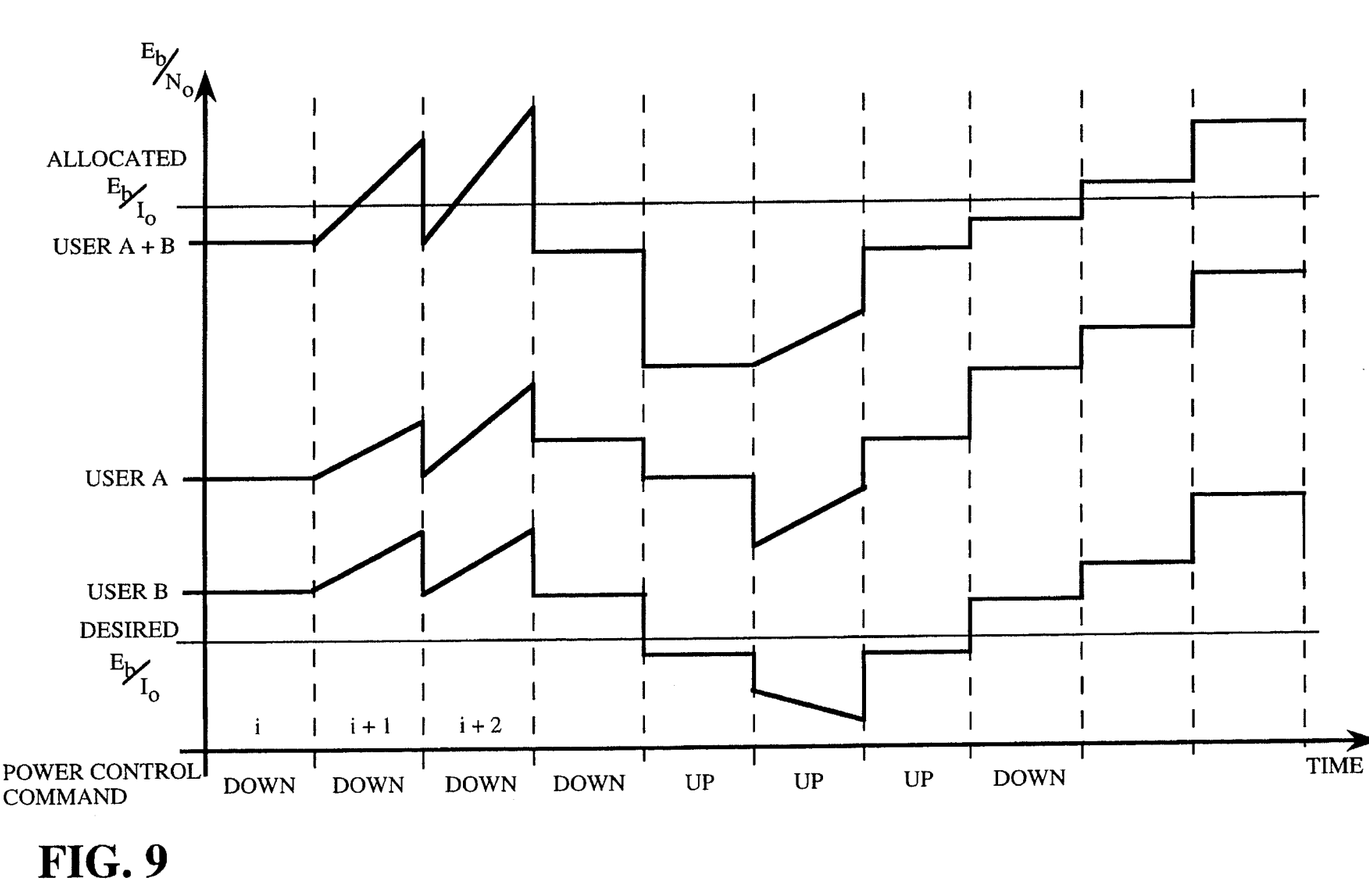
FIG. 9 shows a plot of the transmit power of two radios and their reaction to power control commands in accordance with the present invention.

An example of the above described power control process is illustrated in FIG. 9. FIG. 9 shows a plot of the transmit power of two users, A and B. The desired $^{Eb}/_{Io}$ is the lower threshold while the upper threshold is the allocated $^{Eb}/_{Io}$. The upper curve shows $\Sigma^{Eb}/_{Io}$ that, in this case, is A+B. The power control commands transmitted by the base station are illustrated at the bottom of the plot.

The initial portions of the user A and user B waveforms are both above the desired $^{Eb}/_{Io}$ and the $\Sigma^{Eb}/_{Io}$ is above the allocated $^{Eb}/_{Io}$. Using the process of the present invention, the base station sends out power control commands instructing the mobiles to turn down their transmit power. As required by IS-95 7.1.3.1.7, a two power control group delay issued before a power control command is implemented. Therefore, the plot shows that the power does not decrease until the slot i+2. This is illustrated in FIG. 4.

After four decrease power control commands, the user B transmit power is below the desired $^{Eb}/_{Io}$. The base station then sends three turn up commands. After the two power control group delay, the output power of user B is above the desired $^{Eb}/_{Io}$ and the $\Sigma^{Eb}/_{Io}$ is above the allocated $^{Eb}/_{Io}$. This process continues in a similar manner.

If a large number of transmissions are received on a busy channel, the power control process of the present invention limits the power output at the allocated $^{Eb}/_{Io}$. This will likely force a higher error rate in some packet transmissions. In this case, the base station can make the decision to power control only a few streams by making the minimum $^{Eb}/_{Io}$ in the above conditions over a subset of the received transmissions. This will likely limit the impact on other mobile radios.

In the preferred embodiment, the desired $^{Eb}/_{Io}$ can be adjusted for different channel conditions so as to maintain a desired packet error rate. If the packet error rate is too high for a desired $^{Eb}/_{Io}$, the base station can increase the desired $^{Eb}/_{Io}$, thus lowering the packet error rate. Alternatively, if the packet error rate is lower than needed, the base station can decrease the desired $^{Eb}/_{Io}$, thus increasing the packet error rate.

This latter adjustment serves to increase the overall system capacity. The adjustments mentioned above may need to be done for different channel conditions. For example, if there are many multipath components, the base station may not be able to combine energy as effectively. In the art, this is called combining loss. On the other extreme, fading may cause a higher packet error rate if there is only one multipath component. To maintain a low packet error rate in both these cases, the base station may increase the desired $^{Eb}/_{Io}$.

In the preferred embodiment, the desired $^{Eb}/_{Io}$ is the same for all mobile radios. Alternatively, the desired $^{Eb}/_{Io}$ could be different for each mobile radio. The previous equations can then be written as:

$$\left( \sum_i (E_b/I_o)_i \geq \text{allocated } E_b/I_o \right)$$

OR $$(\forall i ((E_b/I_o)_i > \text{desired}(E_b/I_o))_i)$$

where i=the $i^{th}$ mobile radio and $\forall i$ signifies that for all i, such that if the above is true, the mobile radio is told to decrease its power; and $$\left( \sum_i (E_b/I_o)_i < \text{allocated } E_b/I_o \right)$$

AND

-continued $$(\exists i|(E_b/I_o)_i \leq \text{desired } (E_b/I_o)_i)$$

where i=the $i^{th}$ mobile radio and ∃i| signifies that there exists an i such that if the above is true, the mobile radio is told to increase its power.

After transmitting the first access probe at a minimum power level, the mobile radio increases the power of successive probes within each access probe sequence by a predetermined step amount. This step amount is different for different embodiments and is set to optimize the system performance.

Figure 5:
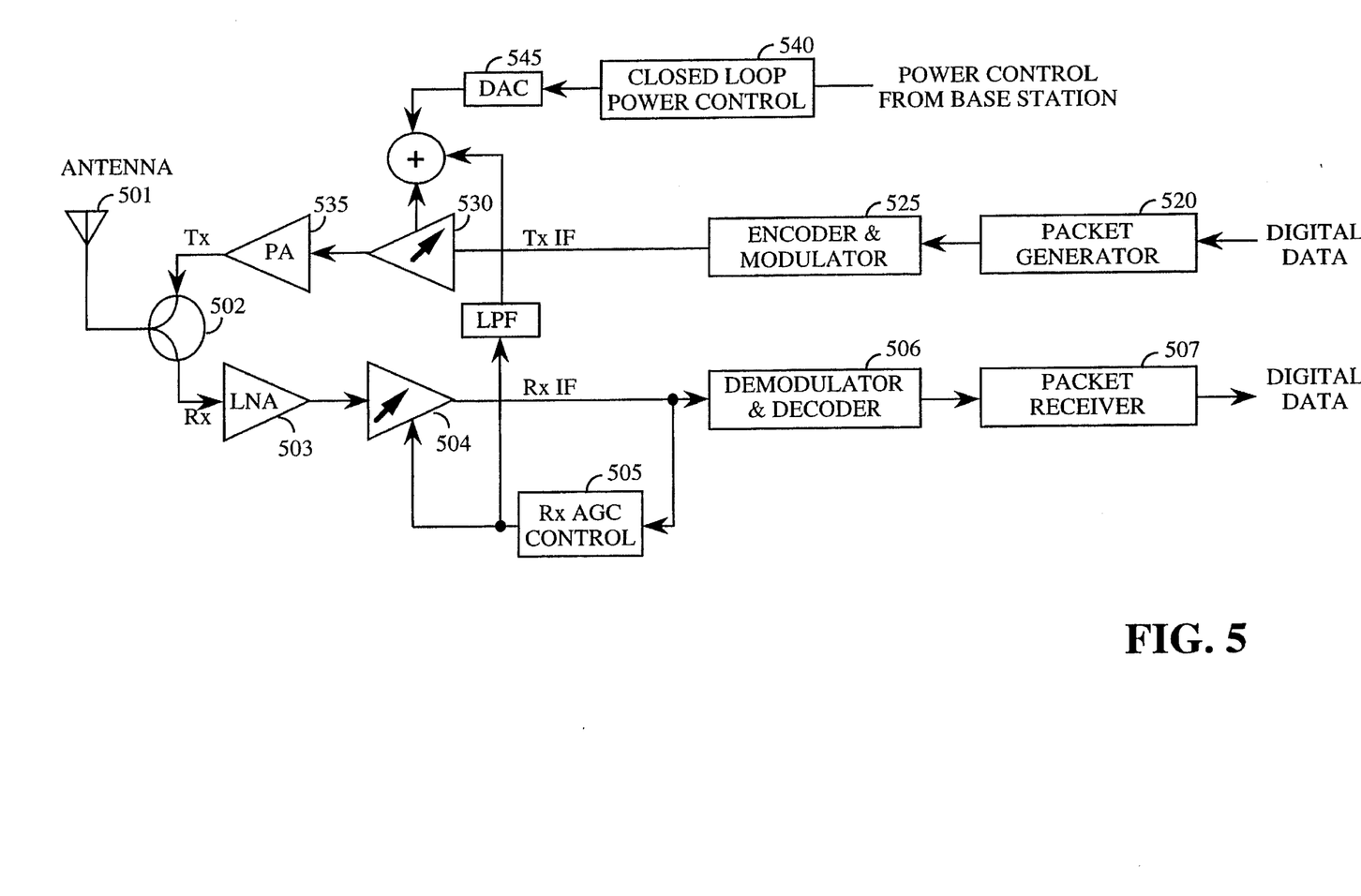
FIG. 5 shows a block diagram of a typical mobile radio in accordance with the present invention.

A simplified block diagram of a typical mobile radio is illustrated in FIG. 5. Signals received from the base station are received with the antenna (501). The duplexer (502) splits the signal to the low noise amplifier (503) that amplifies the signal. This amplified signal is then input to a variable gain amplifier (504), the gain of which is controlled by a receive automatic gain control circuit (505). The output of the variable gain amplifier (504) is input to a demodulator and decoder (506). The demodulator portion removes the signal modulation so that the packetized information can be broken up by the packet receiver (507) into a digital form that is usable by a computer or other electronic device.

A digital signal to be transmitted from a computer or other electronic device is first packetized (520). The packets of data are then modulated by the encoder and modulator (525). The modulated signal is input to a variable gain amplifier (530) that amplifies the signal prior to the fixed gain power amplifier (535). The output of the power amplifier (535) is input to the duplexer (502) that couples the signal to the antenna (501) to be radiated.

The gain of the variable gain amplifier is controlled by the power control bit of the present invention that is transmitted by the base station. When the mobile radio receives the power control bit, it is input to the closed loop power control circuitry (540). This circuitry (540) simply determines whether the power control bit is a logic 1 or a logic 0 and generates the proper control voltage to increase or decrease the gain of the variable gain power amplifier (530).

In the preferred embodiment, the gain is increased or decreased in 1 dB increments. The power control circuitry (540) outputs a digital value indicative of each 1 dB increase or decrease. This digital value is input to a digital to analog converter (DAC) (545). The DAC converts the digital value to an analog signal that controls the gain of the variable gain power amplifier. In this way, the process of the present invention enables the base station to dynamically adjust the transmit power of the mobile radio as conditions change.

Alternatively, the increase and decrease in gain does not have to be by the same amount. In addition, the increase and decrease in power control gain may adapt based upon the sequence of up or down commands that have been received by the mobile radio.

Figure 6:
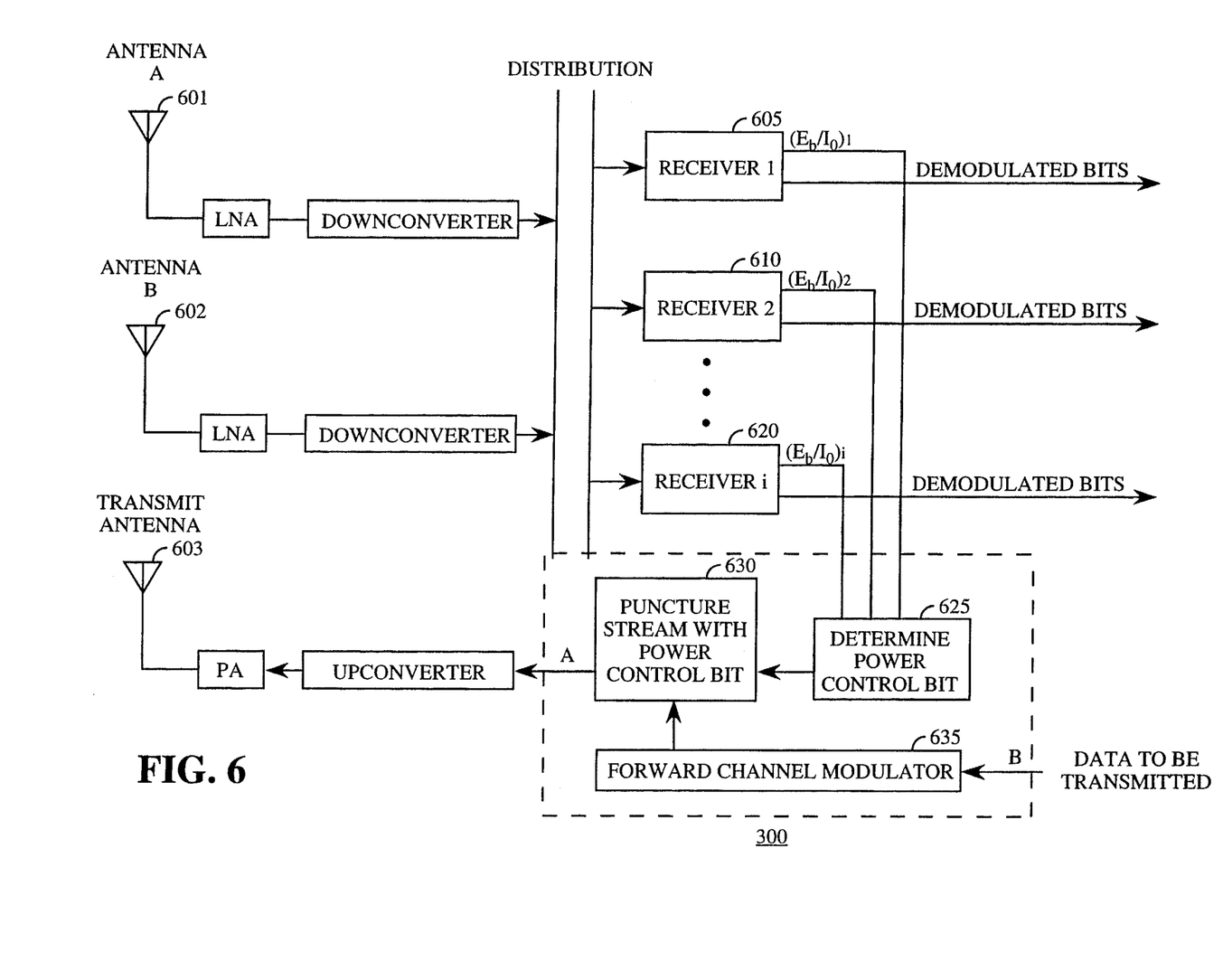
FIG. 6 shows a block diagram of a typical base station in accordance with the present invention.

FIG. 6 shows a block diagram of a typical CDMA base station system incorporating the power control process of the present invention. This diagram shows the antennas of a base station (601 and 602) that receive the signals transmitted from the mobile radio. The received signals are distributed to various receivers (605–620) depending on which one is being used. The receivers (605–620) generate the demodulated bits for use by other devices such as external computers.

The receivers (605–620) also generate the signal to interference ratios, $^{Eb}/_{Io}$, that are used by the power control process of the present invention (625) to generate the power control bits. These bits are inserted into the power control stream by puncturing (630) the forward channel signal that has been generated by the modulator (635). This signal is then eventually transmitted by the transmit antenna (603) to the mobile radio.

In the preferred embodiment, the power control is performed by a single bit. Alternate embodiments, however, use multiple bits to form a power control command word. Such a word can not only control the direction of the transmit power but the rate of power change. For example, one bit of the command instructs the radio to increase power while another bit of the command instructs the increase to be in 2 dB increments instead of 1 dB.

In summary, the power control process of the present invention uses a single power control bit stream from the base station to control the transmit power of multiple radios. The signal quality metric, $^{Eb}/_{Io}$, is used to determine whether to increase or decrease the power and what amount of power change is needed.

I claim:

1. A method for controlling transmit power of a plurality of radios, the plurality of radios communicating with a base station, the method comprising the steps of:

the base station determining the transmit power required from each radio of the plurality of radios;

the base station instructing more than one of the plurality of radios to monitor a single power control bit stream; and the base station transmitting said single power control bit stream to the more than one of the plurality of radios to instruct each of the more than one of the plurality of radios to alter its transmit power in response to the required transmit power.

2. The method of claim 1 wherein the step of determining the transmit power comprises the steps of:

determining a first signal quality threshold;

determining a second signal quality threshold;

determining a signal quality metric for each radio of the plurality of radios; and comparing the signal quality metrics for the plurality of radios to the first and second signal quality thresholds.

3. The method of claim 2 wherein the signal quality metric is an energy per bit to total interference spectral density ratio.

4. The method of claim 2 and further including the steps of:

increasing the transmit power of a radio having a signal quality metric that is less than the first signal quality threshold; and decreasing the transmit power of a radio having a signal quality metric that is greater than the second signal quality threshold.

5. The method of claim 2 wherein the first signal quality threshold is a minimum signal quality threshold and the second signal quality threshold is a maximum signal quality threshold.

6. A method for controlling a power output of a remote transmitter in a first mobile radio of a plurality of mobile radios, the first mobile radio receiving signals from a base station over a forward channel wherein said forward channel includes a first slot assigned to at least said first mobile radio and a second slot assigned to at least one other of said plurality of mobile radios, the base station receiving signals from the first mobile radio over a reverse channel, the method comprising the steps of:

determining a maximum reverse channel signal quality metric;

determining a desired reverse channel signal quality metric;

determining a reverse channel signal quality metric for each of the plurality of mobile radios, thus creating a plurality of reverse channel signal quality metrics;

determining a minimum reverse channel signal quality metric of the plurality of mobile radios;

summing the plurality of reverse channel signal quality metrics; and the base station instructing the first mobile radio to monitor transmission of power control information in said first slot, said power control information instructing the remote transmitter to decrease the power output if the sum of the reverse channel signal quality metrics is greater than or equal to the maximum reverse channel signal quality metric or the minimum reverse channel signal quality metric is greater than the desired reverse channel signal quality metric.

7. The method of claim 6 and further including the step of the base station adjusting a minimum reverse channel energy per bit to total interference spectral density ratio depending on reverse channel conditions.

8. The method of claim 6 and further including the step of adjusting a maximum reverse channel energy per bit to total interference spectral density ratio in response to an increase or decrease in the quantity of said plurality of mobile radios.

9. The method of claim 6 wherein the mobile radio is a code division multiple access radiotelephone and the base station is a code division multiple access base station.

10. The method of claim 6 wherein the signal quality metric is an energy per bit to total interference spectral density ratio.

11. The method of claim 10 wherein the energy per bit to total interference spectral density ratio is $E_b/I_o$.

12. A method for controlling a power output of a remote transmitter in a first mobile radio of a plurality of mobile radios, the first mobile radio receiving signals from a base station over a forward channel, the base station receiving signals from the first mobile radio over a reverse channel, the method comprising the steps of:

determining a maximum reverse channel signal quality metric;

determining a desired reverse channel signal quality metric;

determining a reverse channel signal quality metric for each of the plurality of mobile radios, thus creating a plurality of reverse channel signal quality metrics;

determining a minimum reverse channel signal quality metric of the plurality of mobile radios;

summing the plurality of reverse channel signal quality metrics; and the base station instructing the remote transmitter to monitor power control information associated with a predefined slot of said forward channel, said power control information instructing the remote transmitter to increase the power output if the sum of the reverse signal quality metrics is less than the maximum reverse channel signal quality metric.

13. The method of claim 12 and further including the step of the base station adjusting a minimum reverse channel energy per bit to total interference spectral density ratio depending on reverse channel conditions.

14. The method of claim 12 and further including the step of adjusting a maximum reverse channel energy per bit to total interference spectral density ratio in response to an increase or decrease in the quantity of the plurality of radiotelephones.

15. A method for controlling a power output of a remote transmitter in a first mobile radio of a plurality of mobile radios, the first mobile radio receiving signals from a base station over a forward channel, the base station receiving signals from the first mobile radio over a reverse channel, the method comprising the steps of:

determining a maximum reverse channel energy per bit to total interference spectral density ratio;

determining a desired reverse channel energy per bit to total interference spectral density ratio;

determining a reverse channel energy per bit to total interference spectral density ratio for each of the plurality of mobile radios, thus creating a plurality of reverse channel energy per bit to total interference spectral density ratios;

determining a minimum reverse channel energy per bit to total interference spectral density ratio of the plurality of mobile radios;

summing the plurality of reverse channel energy per bit to total interference spectral density ratios; and the base station instructing the remote transmitter to monitor power control information associated with a predefined slot of said forward channel, said power control information instructing the remote transmitter to increase the power output if the minimum reverse energy per bit to total interference spectral density ratio is less than or equal to the desired reverse channel energy per bit to total interference spectral density ratio.

16. A method for controlling power output of a first remote transmitter of a plurality of remote transmitters, each remote transmitter being part of a mobile radiotelephone, the plurality of mobile radiotelephones receiving data packets from a cellular base station over a forward channel, the cellular base station receiving data packets from the plurality of mobile radiotelephones over a reverse channel, the reverse channel having a maximum energy per bit to total interference spectral density ratio, the data packets being comprised of frames, the method comprising the steps of:

determining a desired reverse channel energy per bit to total interference spectral density ratio;

determining a energy per bit to total interference spectral density ratio on the reverse channel for each of the remote transmitters, thereby creating a plurality of energy per bit to total interference spectral density ratios;

summing the plurality of energy per bit to total interference spectral density ratios to produce a summation value;

determining a minimum reverse channel energy per bit to total interference spectral density ratio for the plurality of mobile radiotelephones;

comparing the maximum reverse channel energy per bit to total interference spectral density ratio to the summation value;

comparing the minimum reverse channel energy per bit to total interference spectral density ratio to the desired energy per bit to total interference spectral density ratio; and the base station instructing the first remote transmitter to decrease power if the summation value is greater than or equal to the maximum reverse channel energy per bit to total interference spectral density ratio or the minimum reverse channel energy per bit to total interference spectral density ratio is greater than the desired reverse channel energy per bit to total interference spectral density ratio.

17. The method of claim 16 wherein each of the energy per bit to total interference spectral density ratios is determined by an $^{Eb}/_{I_o}$ of the reverse channel.

18. The method of claim 16 wherein each of the energy per bit to total interference spectral density ratios is determined by a $^{Pr}/_{N_o}$ of the reverse channel.

19. The method of claim 16 wherein each of the energy per bit to total interference spectral density ratios is determined by a scaled version of an $^{Eb}/_{I_o}$ of the reverse channel.

20. A method for controlling power output of a first remote transmitter of a plurality of remote transmitters, each remote transmitter being part of a mobile radiotelephone, the plurality of mobile radiotelephones receiving data packets from a cellular base station over a forward channel, the cellular base station receiving data packets from the plurality of mobile radiotelephones over a reverse channel, the reverse channel having a maximum energy per bit to total interference spectral density ratio, the data packets being comprised of frames, the method comprising the steps of:

determining a desired reverse channel energy per bit to total interference spectral density ratio;

determining a energy per bit to total interference spectral density ratio on the reverse channel for each of the remote transmitters, thereby creating a plurality of energy per bit to total interference spectral density ratios;

summing the plurality of energy per bit to total interference spectral density ratios to produce a summation value;

determining a minimum reverse channel energy per bit to total interference spectral density ratio for the plurality of mobile radiotelephones;

comparing the maximum reverse channel energy per bit to total interference spectral density ratio to the summation value;

comparing the minimum reverse channel energy per bit to total interference spectral density ratio to the desired energy per bit to total interference spectral density ratio; and the base station instructing the first remote transmitter to increase power if the summation value is less than the maximum reverse channel energy per bit to total interference spectral density ratio and the minimum reverse channel energy per bit to total interference spectral density ratio is less than or equal to the desired reverse channel energy per bit to total interference spectral density ratio.

21. The method of claim 20 and further including the step of the base station adjusting the minimum reverse channel energy per bit to total interference spectral density ratio depending on reverse channel conditions.

22. The method of claim 20 and further including the step of adjusting the maximum reverse channel energy per bit to total interference spectral density ratio in response to an increase or decrease in the quantity of the plurality of radiotelephones.

23. A method for controlling transmit power of a plurality of radios, the plurality of radios communicating with a base station, the method comprising the steps of:

the base station determining the transmit power required from each radio of the plurality of radios;

the base station transmitting a power control message multiplexed into a series of power control slots, each of said power control slots including power control information instructing each radio within an associated subset of said plurality of radios to alter its transmit power;

the base station instructing each radio within the same said associated subset to monitor said power control information in a same one of said power control slots.

24. A method for controlling transmit power of a plurality of radios using a power control message provided by a base station, the method comprising the steps of:

receiving, at more than one of said plurality of radios, instructions to monitor the same selected portion of said power control message; and receiving, at said more than one of said plurality of radios, power control information within said same selected portion of said power control message, said power control information instructing each of said more than one of said plurality of radios to alter its transmit power in response to a required transmit power.

25. A method for controlling transmit power of a plurality of radios using a power control message provided by a base station, the method comprising the steps of:

transmitting, from said base station, instructions indicating that a subset said radios monitor the same selected portion of said power control message; and transmitting, from said base station, power control information within said same selected portion of said power control message, said power control information indicating that transmission power of each of said more than one of said plurality of radios should be altered in response to a required transmit power.

26. A method for controlling transmit power of a plurality of radios, the plurality of radios communicating with a base station, the method comprising the steps of:

the base station determining the transmit power required from each radio of the plurality of radios;

the base station instructing a first subset of said plurality of radios to monitor a first power control bit stream, and a second subset of said plurality of radios to monitor a second power control bit stream; and the base station transmitting said first and said second power control bit streams to instruct each of the plurality of radios in the first and second subsets of said plurality of radios to alter its transmit power in response to the required transmit power.

27. A method for controlling transmit power of a plurality of radios, the plurality of radios communicating with a base station, the method comprising the steps of:

the base station determining the transmit power required over a reverse channel from each radio of the plurality of radios; and the base station transmitting a single power control bit stream to the more than one of said plurality of radios to instruct each of the more than one of said plurality of radios to alter its transmit power in response to the required transmit power and in response to a maximum total reverse channel signal quality metric;

wherein said maximum total reverse channel signal quality metric is set based upon a sum of reverse channel signal quality metrics associated with said plurality of radios.

28. A method for controlling a power output of a remote transmitter in a first mobile radio of a plurality of mobile radios, the first mobile radio receiving signals from a base station over a forward channel, the base station receiving signals from the first mobile radio over a reverse channel, the method comprising the steps of:

determining a reverse channel signal quality metric for each of the plurality of mobile radios, thus creating a plurality of reverse channel signal quality metrics;

summing the plurality of reverse channel signal quality metrics; and the base station instructing the remote transmitter to decrease the power output at least if the sum of the reverse channel signal quality metrics is greater than or equal to a maximum reverse channel signal to noise ratio.

29. The method of claim 28 further including the steps of:

determining a minimum reverse channel signal quality metric of the first mobile radio; and the base station instructing the remote transmitter to decrease the power output if the minimum reverse channel signal quality metric is greater than a desired reverse channel signal quality metric.

* * * * *